April 9, 1968

H. S. MURPHY 3,376,909

VEGETABLE-SLICING APPARATUS

Filed Feb. 17, 1966

INVENTOR.
HERBERT S. MURPHY
BY
Robert K. Youtie
ATTORNEY.

April 9, 1968  H. S. MURPHY  3,376,909
VEGETABLE-SLICING APPARATUS
Filed Feb. 17, 1966  2 Sheets-Sheet 2

INVENTOR.
HERBERT S. MURPHY
BY
Robert K. Youtie
ATTORNEY.

United States Patent Office 3,376,909
Patented Apr. 9, 1968

3,376,909
VEGETABLE-SLICING APPARATUS
Herbert S. Murphy, Church Road,
Moorestown, N.J. 08057
Filed Feb. 17, 1966, Ser. No. 528,168
6 Claims. (Cl. 146—169)

ABSTRACT OF THE DISCLOSURE

This invention is essentially concerned with slicing apparatus for vegetables wherein an upwardly facing cutter assembly provides a rest for supporting a vegetable prior to cutting, a back member upstands from the back of the cutter assembly having its forward side hollow to maintain a vegetable generally upright leading on the back member, a pusher is mounted on ways for reciprocatory movement downwardly toward and upwardly away from the cutter assembly for pushing a vegetable through the cutter assembly, and a powered crank is mounted over the pushed for operating the latter.

---

This invention relates generally to slicing apparatus, and is especially concerned with apparatus for slicing vegetables.

While the device of the present invention has been primarily developed and employed for use in the slicing of potatoes, particularly large Idaho potatoes for French frying, and will be illustrated and described hereinafter with particular reference thereto, it is appreciated that the device is capable of use with other vegetables and the like, all of which applications are intended to be comprehended herein.

As is well known to those versed in the field of institutional and commercial food preparation, the slicing of potatoes and the like remains a time-consuming and expensive operation. While manually operated slicing machines have been proposed and employed, such machines are subject to operator fatigue and other undesirable variations in rate of production. The proposal of highly automated slicing apparatus has not been found commercially practicable for restaurants, hotels, institutions, and the like, by reason of cost and space, and have therefore not met with commercial acceptance.

Accordingly, it is an important object of the present invention to provide a vegetable-slicing apparatus for use in commercial food preparation which is substantially automatic in operation, capable of producing uniformly attractively sliced product, at a rapid and constant rate, and without operator fatigue.

It is a further object of the present invention to provide a vegetable-slicing apparatus having the advantageous characteristics mentioned in the preceding paragraph, which is extremely simple in construction, durable and reliable throughout a long useful life, and which can be economically manufactured for sale and installation at a reasonable cost.

Other objects of the present invention will become apparent upon reading the following specification and referring to the accompanying drawings, which form a material part of this disclosure.

The invention accordingly consists in the features of construction, combinations of elements, and arrangements of parts, which will be exemplified in the construction hereinafter described, and of which the scope will be indicated by the appended claims.

Figures 1, 2, 3:
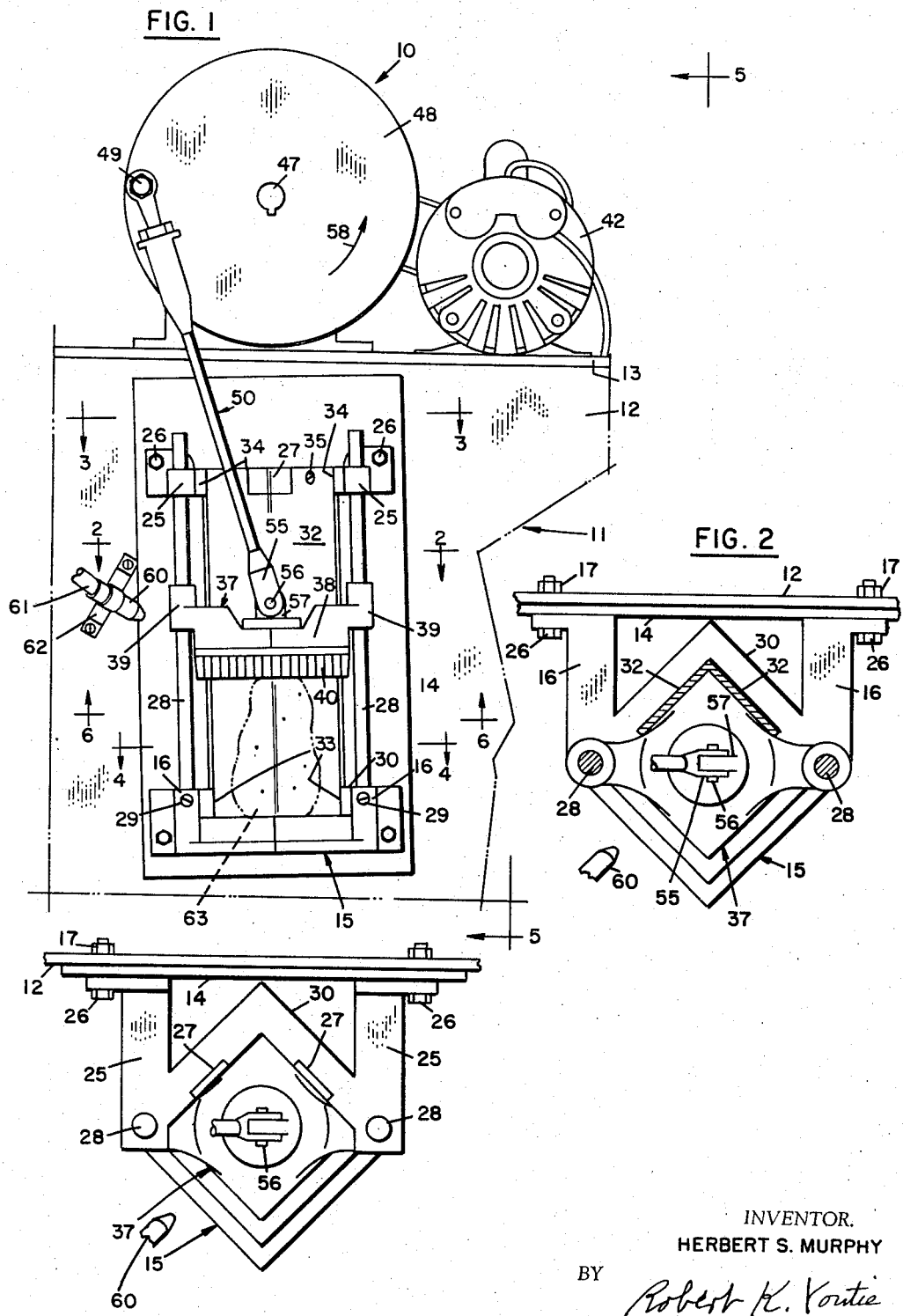
FIGURE 1 is a front elevational view showing a vegetable-slicing device constructed in accordance with the teachings of the present invention.
FIGURE 2 is a transverse sectional view taken generally along the line 2—2 of FIGURE 1.
FIGURE 3 is a transverse sectional view taken generally along the line 3—3 of FIGURE 1.

Referring now more particularly to the drawings, and specifically to FIGURE 1 thereof, a vegetable-slicing apparatus of the present invention is there generally designated 10, and is illustrated as being arranged in an upright relationship. However, as will become apparent the apparatus many also be employed in a generally horizontal relationship, if desired.

A fixed mounting structure is generally designated 11 and may include an upright member or wall 12 having at its upper end an upper, generally horizontal wall 13. Fixed to the upright wall 12, in facing relation therewith, is a generally vertically elongate mounting plate 14.

Projecting generally horizontally outward from a lower region of the mounting plate 14 is a cutter support, generally designated 15. The cutter support 15 includes a pair of laterally spaced arms or braces 16, see FIGURE 4, projecting generally horizontally outward from wall 12 and plate 14, being fixedly secured thereto by any suitable means, such as fasteners 17. Extending laterally between the spaced arms 16 the cutter support 15 includes a generally horizontal, open frame 18, which may be of generally rectangular configuration having a central, generally vertically extending thru opening 19. The cutter support 15 may be considered as facing generally upwardly and is provided extending across its central open 19 with a plurality of intersecting cutting elements or blades 20. The blades 20 may be of egg-crate-like construction for interfitting engagement at their intersections, and may have their upper edges knifelike and substantially flush with the upper surface of open frame 18.

Spaced generally vertically above the cutter support 15 are a pair of laterally spaced upper braces 25 in respective alignment with the lower braces 16 and projecting generally horizontally outward from wall 12 and plate 14 being fixedly secured thereto, as by fasteners 26. Extending generally laterally between the forward or outer ends of arms 25 is a transverse brace or bridging member 27. The brace member 27 may be of angulate or right-angular configuration, extending from the forward ends of arms 25 rearwardly or inwardly toward plate 14 and defining therebetween an angle facing generally forwardly.

Upstanding from opposite sides of the cutter support 15, at the forward or outer ends of the arms 16 are a pair of laterally spaced, generally parallel rods 28. The rods 28 may have their lower ends anchored in respective arms 16, as by fasteners 29, and may have their upper ends extending upwardly through the forward end regions of arms 25, so as to be fixedly maintained in their upright parallel spaced relationship.

Figures 4, 5, 6:
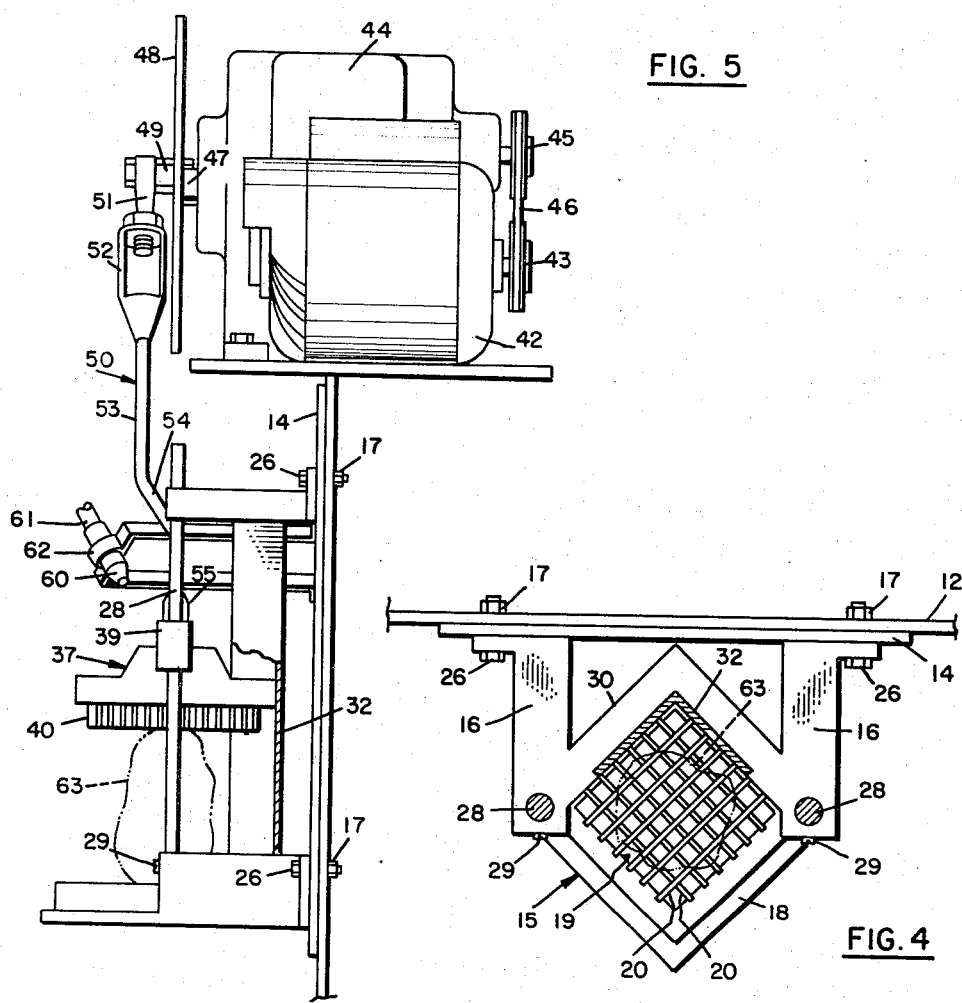
FIGURE 4 is a transverse sectional view taken generally along the line 4—4 of FIGURE 1, a vegetable being shown in phantom.
FIGURE 5 is a side elevational view taken generally along the line 5—5 of FIGURE 1.
FIGURE 6 is a transverse sectional view taken generally along the line 6—6 of FIGURE 5.

A laterally extending brace 30, of generally angulate, or right-angular configuration extends between forward regions of lower arms 16, see FIGURES 1, 2 and 4, just over the rearward or inner portion of frame 18. The brace or bridging member 30 converges rearwardly from the arms 16 toward the plate 14, the included angle thereof facing forwardly. Extending generally vertically between the lower brace 30 and upper brace 27 is a back member 32. The back member 32 may be fabricated of a single sheet of suitable material, such as stainless steel or other, and be bent along a longitudinal centerline to form a dihedral angle of approximately 90 degrees. Thus, the back member 32 includes a pair of generally upright, angularly disposed walls, and extends between the lower and upper brace members 30 and 27. In particular, the lower brace member 30 may be formed on its forward side with a pair of recesses 33, and the upper brace member 27 may be formed on its forward side with a similar pair of recesses 34, see FIGURE 1. The lower end of the back member 32 is conformably engageable in the lower brace member recesses 33, and the upper end of the back member is conformably engageable in the upper brace member recesses 34. Suitable securing means, such as fasteners 35 may be employed to fix the lower and upper ends of back member 32 to the lower and upper brace members 30 and 27. As is best seen in FIGURES 2–4, the back member 32 is recessed into the brace members 30 and 27, so that the front or transversely concave surface of the back member is substantially flush with the front surfaces of the brace members 30 and 27. Thus, the back member 32 is of substantially constant cross-sectional configuration throughout its extent between the lower and upper brace members 30 and 27 having a forwardly facing internal dihedral angle of approximately 90 degrees in a substantially horizontal plane throughout its vertical extent.

A pusher is generally designated 37, and includes a generally rectangular, substantially horizontal body or block 38. The pusher body 38 extends generally horizontally between the rods 28, and is provided at opposite sides with generally vertically disposed bearings 39 respectively slidably receiving rods 28. In this manner, the pusher body 38 is mounted for up-and-down reciprocation on the rods 28, the latter providing ways for the pusher. By its generally rectangular configuration in a substantially horizontal plane, the rearward region of the pusher body 38 is conformably received within the transversely concave configuration of back member 32, see FIGURES 2 and 3, and is movable along the back member in this conformably received relationship.

Depending from the underside of the pusher body 38 are a plurality of pusher bosses or projections 40. Upon downward movement of the pusher body 38, the several projections 40 are respectively engageable in the openings between intersecting blades 20, as will appear more fully hereinafter.

Mounted on the upper horizontal plate 13 may be a drive motor 42 of suitable capacity and provided with a drive member or pulley 43. Also mounted on the upper support plate 13, adjacent to the motor 42 may be a power transmission or gear reducer 44 having an input member or pulley 45 connected in driven relation with drive member 43, as by a belt 46. An output shaft 47 projects from the speed reducer 44 generally directly over the upper brace member 30. The output shaft 47 may carry a crank wheel 48 for rotation with the shaft, and having adjacent to its periphery a journal pin 49. A connecting rod or link 49 is pivotally connected between the journal pin 49 and the pusher 37.

More particularly, the connecting rod or link 50 may include an eye 51 rotatably carried by the pin 49 and threadedly connected to a receiving member 52 for link-length adjustment. Extending from the receiving member 52 may be a shaft 53 having its lower portion 54 inwardly offset and provided on its lower end with a clevis 55. The clevis 55 may be pinned, as at 56, to an upstanding eye 57 carried centrally on the pusher body 38. Thus, link 50 serves in the manner of a connecting rod to effect reciprocation of pusher 37 upon rotation of crank wheel 48 with shaft 47.

In FIGURE 1 it will be seen that crank wheel 48 rotates counterclockwise, in the direction of arrow 58, in the illustrated embodiment. While the direction of crank-wheel rotation is not critical, it should be noted that the centerline or axis of movement of pusher 37, as transmitted thereto through pin 56 is slightly askew with respect to the axis of shaft 47. Thus, the link 50 in its fully extended dead-center position is out of alignment with the direction of pusher movement. By this arrangement, with the axis or direction of pusher movement oblique to a radius of shaft 47, and passing the latter on the side of its working stroke, the left side as seen in FIGURE 1, a greater pushing force can be obtained at the pusher 37 when required. Stated otherwise, the link 50 will be aligned with the direction of pusher movement during the working stroke thereof at a location ahead of dead center.

Located to one side of the rods or ways 28, preferably forward thereof and directed rearwardly and downwardly is a fluid-discharge element or nozzle 60 connected by any suitable conduit means 61 to a supply of liquid lubricant. The nozzle may be mounted in any desired manner, as by a mounting bracket 62 fixed to the wall 12.

While the operation of the instant vegetable slicer is believed apparent from the foregoing description, it may be briefly reviewed. The motor 42 effects continuous rotation of crank wheel 48 at a desired speed, in accordance with the selected speed reduction of transmission 44. The pusher 37 is reciprocated by the crank wheel 48 through the link 50 between an upper position adjacent to the upper arms 25, and lower position adjacent to the lower arms 16. In the lower position the nether bosses 40 of the pusher 37 engage through respective spaces between the cutter elements or blades 20. The nozzle 60 may deliver a constant supply of lubricant, such as cold water, into the region traversed by the pusher 37. Upon each upward stroke of the pusher 37 a potato 63, or other vegetables to be sliced, is placed on the blades 20 over the central opening 19 of the cutter support 15. The vegetable article 63 may lean rearwardly against the back member 32. Upon the downward or working stroke of pusher 37 the vegetable 63 is forced by the pusher through the central cutter-support opening 19, simultaneously being sliced by the blades 20. This procedure is repeated at a relatively rapid rate to achieve a highly efficient production of substantially perfectly sliced product.

While the device of the present invention, as illustrated and described hereinbefore, contemplates the manual feeding of a vegetable 63, either by an operator's hand or on the end of a fork, or the like, it is appreciated that automatic feeding means may be employed in conjunction with the instant invention without departing from the scope of the inventive concept. Further, automatic safety features may be incorporated, such as protective guards and interlocking cutoff switches to insure the safety of an operator or other persons in the environment.

From the foregoing it is seen that the present invention provides a vegetable-slicing apparatus which fully accomplishes its intended objects and is well adapted to meet practical conditions of manufacture, installation, maintenance and use.

Although the present invention has been described in some detail by way of illustration and example for purposes of clarity of understanding, it is understood that certain changes and modifications may be made within the spirit of the invention and scope of the appended claims.

What is claimed is:

1. A vegetable-slicing apparatus comprising a mounting structure, a centrally open cutter support fixed relative to said mounting structure and facing upwardly, cutters extending across said cutter support, a back member fixed relative to said mounting structure and extending upwardly from the back of said cutter support for lateral supporting engagement with a vegetable to be sliced on said cutters, ways fixed relative to said mounting structure and extending upwardly from opposite sides of said cutter support, a pusher mounted on said ways for upwardly and downwardly movement therealong toward and away from said cutter support to move a vegetable against said cutters, a powered crank mounted for rotative movement at a location spaced upwardly from said cutter support, and a connecting link pivotally connected between said crank and pusher for effecting reciprocation of the latter.

2. A vegetable-slicing apparatus according to claim 1, said ways extending askew of the axis of rotation of said crank for alignment with said link in a working-stroke position of the latter ahead of dead center.

3. A vegetable-slicing apparatus according to claim 1, said ways including a pair of rods extending from opposite sides of said cutter support, said pusher extending across said cutter support and being slidably mounted on said rods.

4. A vegetable-slicing apparatus according to claim 3, said back member extending longitudinally of and transversely between said rods and having a forwardly facing hollow for receiving said pusher.

5. A vegetable-slicing apparatus according to claim 4, in combination with brace means projecting laterally from said mounting structure to said rods to rigidify the latter, said connecting link passing spacedly through said brace means upon reciprocation of said pusher.

6. A vegetable-slicing apparatus according to claim 5, said rods being generally parallel to each other and extending askew of the axis of rotation of said crank for alignment with said link in a working-stroke position of the latter ahead of dead center.

References Cited

UNITED STATES PATENTS

| | | | |
|---|---|---|---|
| 810,998 | 1/1906 | Thomas | 146—169 X |
| 2,057,355 | 10/1936 | Wolfinger | 146—169 |
| 2,373,937 | 4/1945 | Paradis | 146—169 X |
| 2,801,661 | 8/1957 | Miller | 146—169 X |
| 3,091,269 | 5/1963 | Burns et al. | 146—169 X |

W. GRAYDON ABERCROMBIE, *Primary Examiner.*